(12) United States Patent
Niiranen et al.

(10) Patent No.: US 8,125,296 B2
(45) Date of Patent: Feb. 28, 2012

(54) RADIO DEVICE ANTENNA FILTER ARRANGEMENT

(75) Inventors: Erkki Niiranen, Ii (FI); Jouni Ala-Kojola, Kempele (FI)

(73) Assignee: Powerwave Comtek Oy, Kempele (FI)

( * ) Notice: Subject to any disclaimer, the term of this patent is extended or adjusted under 35 U.S.C. 154(b) by 604 days.

(21) Appl. No.: 11/718,537

(22) PCT Filed: Nov. 7, 2005

(86) PCT No.: PCT/FI2005/050400
§ 371 (c)(1),
(2), (4) Date: May 3, 2007

(87) PCT Pub. No.: WO2006/058964
PCT Pub. Date: Jun. 8, 2006

(65) Prior Publication Data
US 2009/0058556 A1  Mar. 5, 2009

(30) Foreign Application Priority Data

Dec. 2, 2004  (FI) ...................................... 20041560

(51) Int. Cl.
*H03H 7/46* (2006.01)
(52) U.S. Cl. ............................ 333/132; 455/78; 455/101
(58) Field of Classification Search .................. 333/132; 455/78–82, 101
See application file for complete search history.

(56) References Cited

U.S. PATENT DOCUMENTS 3,091,743 A * 5/1963 Wilkinson .................... 333/127
(Continued)

FOREIGN PATENT DOCUMENTS

EP  1237223 A2  9/2002
(Continued)

OTHER PUBLICATIONS

European Patent Office Communication relating to European Patent Application No. 05 803 809.2-1248 mailed Jul. 12, 2010.

*Primary Examiner* — Robert Pascal
*Assistant Examiner* — Kimberly E Glenn
(74) *Attorney, Agent, or Firm* — OC Patent Law Group

(57) ABSTRACT

An arrangement for filtering the transmitting signals in a radio device using frequency division duplex. In a radio transmitter, in which the transmitting signal is divided to a plurality of antennas radiating to different sectors, the filtering required in transmitting is mostly carried out by a shared transmitting filter before the transmitting signal is divided. The rest of the filtering is carried out separately on each partial transmitting signal in the reduced transmitting side of the duplex filter. The filters and the divider form an integrated filter unit, in which they are connected to each other by simple coupling elements. The space required for the filters of the antenna end of the radio device is significantly reduced, and the material and assembly costs of the antenna end in production are reduced.

10 Claims, 4 Drawing Sheets

U.S. PATENT DOCUMENTS

| | | | | |
|---|---|---|---|---|
| 4,715,048 | A | * | 12/1987 | Masamura .................... 375/347 |
| 4,875,024 | A | | 10/1989 | Roberts |
| 5,724,666 | A | * | 3/1998 | Dent ......................... 455/562.1 |
| 7,113,748 | B2 | * | 9/2006 | Shapira et al. ............... 455/63.4 |
| 2001/0026202 | A1 | | 10/2001 | Raty |
| 2001/0036842 | A1 | | 11/2001 | Jantti |
| 2004/0018815 | A1 | | 1/2004 | Lin et al. |

FOREIGN PATENT DOCUMENTS

| | | |
|---|---|---|
| JP | 8079118 | 3/1996 |
| JP | 11150495 | 6/1999 |
| WO | 0039943 | 7/2000 |

* cited by examiner

RADIO DEVICE ANTENNA FILTER ARRANGEMENT

The invention relates to an arrangement for filtering the transmitting signals in a radio device using frequency division duplex. The arrangement is suitable for use especially in the base stations of mobile communication networks.

In a two-way radio system, in which a signal is transmitted simultaneously with the receiving of another signal, the transmitting and receiving signals are separated using either frequency or time division. In the former case, a duplex filter is needed at the antenna end of the device, primarily to prevent the transmitting signal from blocking the receiver by directing it only to the antenna shared between the transmitting and receiving, and by directing the signal coming from the antenna only to the receiver.

The capacity of cellular networks is the higher the closer to each other the cells are in which the same carrier frequency can be used. If a plurality of antennas radiating to different sectors are used in the base stations of the network instead of an omnidirectional antenna, base stations at a certain distance from each other, using the same carrier frequency, interfere less with the radio communication in the cells of each other. This means that the reuse distance of frequencies can be reduced and the capacity of the network thus increased.

Figure 1:
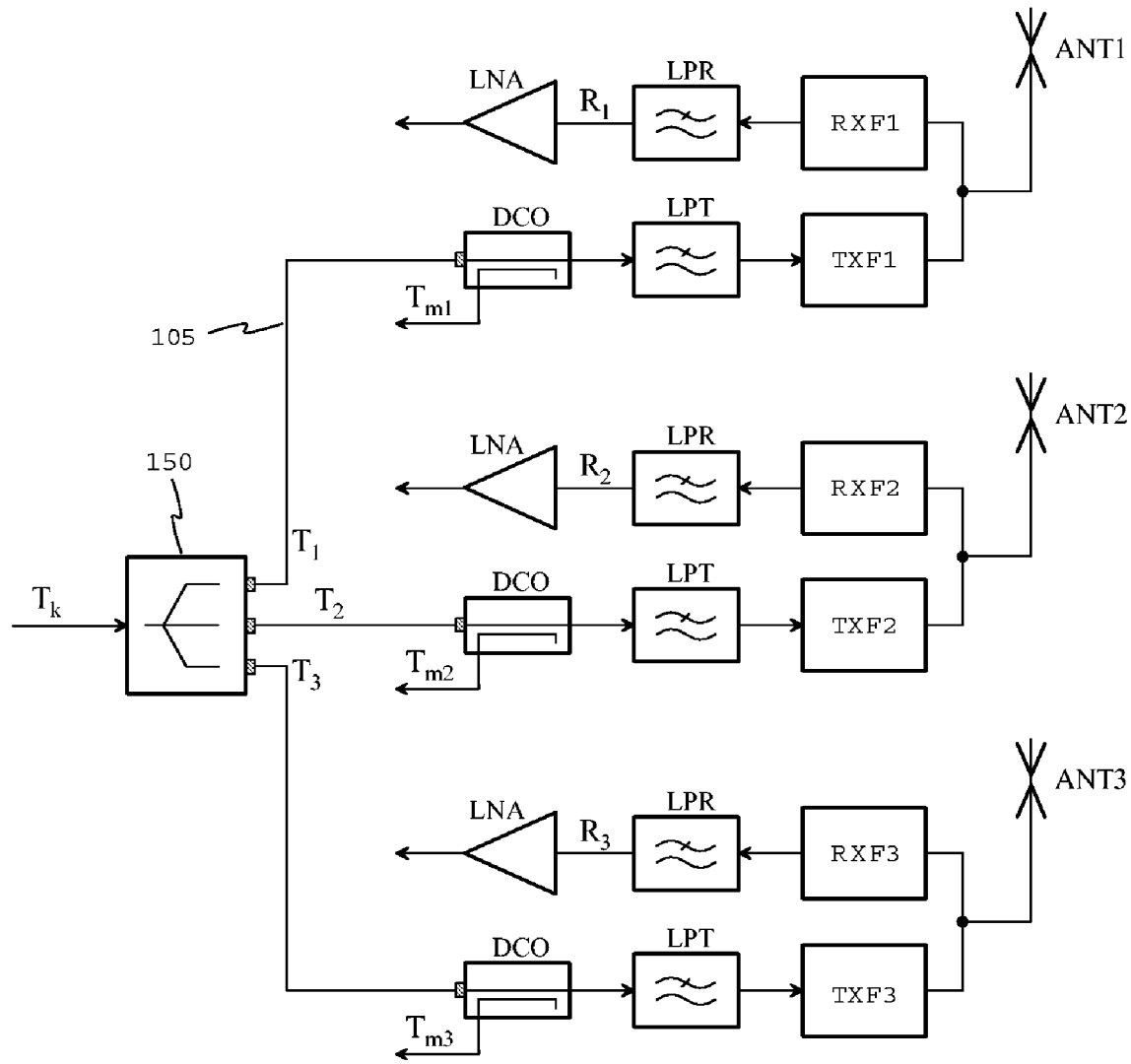

On the other hand, the use of several antennas increases the amount of equipment in the base station. This is illustrated in FIG. 1, which presents an example of a prior art arrangement at the antenna end of the base station as a block diagram.

There are three antennas, each of which radiates to one sector of nominally 120 degrees. For each antenna there is a separate filter arrangement, which are mutually identical. For example, for the first antenna ANT1, there is a duplex filter having a transmitting side TFX1 and receiving side RFX1. The output of the former and the input of the latter are coupled to the antenna. The receiving side RFX1 of the duplex filter is of the bandpass type, and it attenuates the frequency components outside the receiving band of the radio system. After the filter RXF1, there is a low-pass filter LPR, the task of which is to attenuate the frequency components in the range above the receiving band even more. The drawing also shows a low-noise amplifier LNA, to which the filtered receiving signal $R_1$ is taken, and the out-put signal of which continues towards the mixer of the receiver. The transmitting side TFX1 of the duplex filter is also of the bandpass type, and it attenuates the frequency components outside the transmitting band of the radio system. Before the filter TXF1 on the transmission path there is a low-pass filter LPT, the task of which is to clean the range above the transmitting band even more of spurious transmissions springing up in the power amplifier, for example. The transmitting side TXF1 of the duplex filter and the low-pass filter LPT form the entire antenna-specific transmitting filter. Before the low-pass filter LPT on the transmitting side there is a directional coupler DCO, by which the strength of the field propagating through it towards the antenna is measured. The measuring signal $T_{m1}$ obtained is used to control the transmitting power of the first antenna ANT1.

The antenna end filters are preferably coaxial resonator filters, because their losses are relatively low. The small amount of losses is especially important on the transmitting side, because all kinds of attenuation between the power amplifier and the antenna result in an increase in the current consumption of the power amplifier and easily in problems of warming up on the circuit board.

The transmitting branches of the antenna end cannot be connected directly in parallel, because the matching of the transmitter would then be difficult. Because of this, the signal to be transmitted coming from the power amplifier of the transmitter, or the transmitting signal $T_k$, is divided into three parts $T_1$, $T_2$ and $T_3$ of the same level in the divider 150. The divider is of the Wilkinson type, for example, in which case a good isolation between the output branches is achieved. In addition, it is lossless in theory, provided that the impedances of the transmission paths continuing forward are correct. The first partial transmitting signal $T_1$ is taken by an intermediate cable 105 to a directional coupler and through it to the first transmitting filter. In the same way, the second partial transmitting signal $T_2$ is taken to the second transmitting filter and the third partial transmitting signal $T_3$ to the third transmitting filter.

The drawback of the arrangement according to FIG. 1 is the relatively large space required by it, which drawback is emphasized when the demand for smaller and smaller base station cabinets increases. The space requirement is caused by the fact that especially bandpass filters are relatively large-sized, and there are three of them in the example of FIG. 1. Firstly, the size of a single filter is due to that in order to achieve the specified stop attenuation, the filter must be of a relatively high order, which means a corresponding number of resonators. Secondly, the size of the filter is due to that single resonators must be relatively large and massive in order to make the losses sufficiently low. A filter with sufficient stop attenuation could be made relatively small, but then its losses would be too high. The losses of a filter appear as attenuation on its passband, or pass attenuation, and, as was mentioned above, they contribute to an increase of the current consumption and heating up of the power amplifier. If there are intermediate cables on the transmission path from the power amplifier to the antennas, such as cable 105 in FIG. 1, the cable and the connectors at its ends cause significant additional losses. As a result of this, a smaller amount of losses is allowed in other parts of the transmission path, and this again results in a still larger size in filters. In addition, the arrangement according to FIG. 1 has the drawback of relatively high manufacturing costs.

The object of the invention is to reduce the above mentioned drawbacks of the prior art. The arrangement according to the invention is characterized in what is set forth in the independent claim 1. Some preferred embodiments of the invention are set forth in the other claims.

The basic idea of the invention is the following: In a radio transmitter, in which the transmitting signal is divided to a plurality of antennas radiating to different sectors, the filtering required in transmitting is mostly carried out before the transmitting signal is divided. The rest of the filtering is carried out separately on each partial transmitting signal in the reduced transmitting side of the duplex filter. Preferably, the filters and the divider form an integrated filter unit, in which they are connected to each other by simple coupling elements.

An advantage of the invention is that the space required by the filters of the antenna end of a radio device radiating to a plurality of sectors is significantly smaller than in corresponding known devices. This is due to that the filter system of the transmitter, which takes the most of space, is for the most part shared between the partial transmitting signals instead of each partial transmitting signal having its own filter. In addition, the invention has the advantage that it simplifies the structure of the antenna end, whereby both the material costs and assembly costs in production are reduced.

Figure 3:
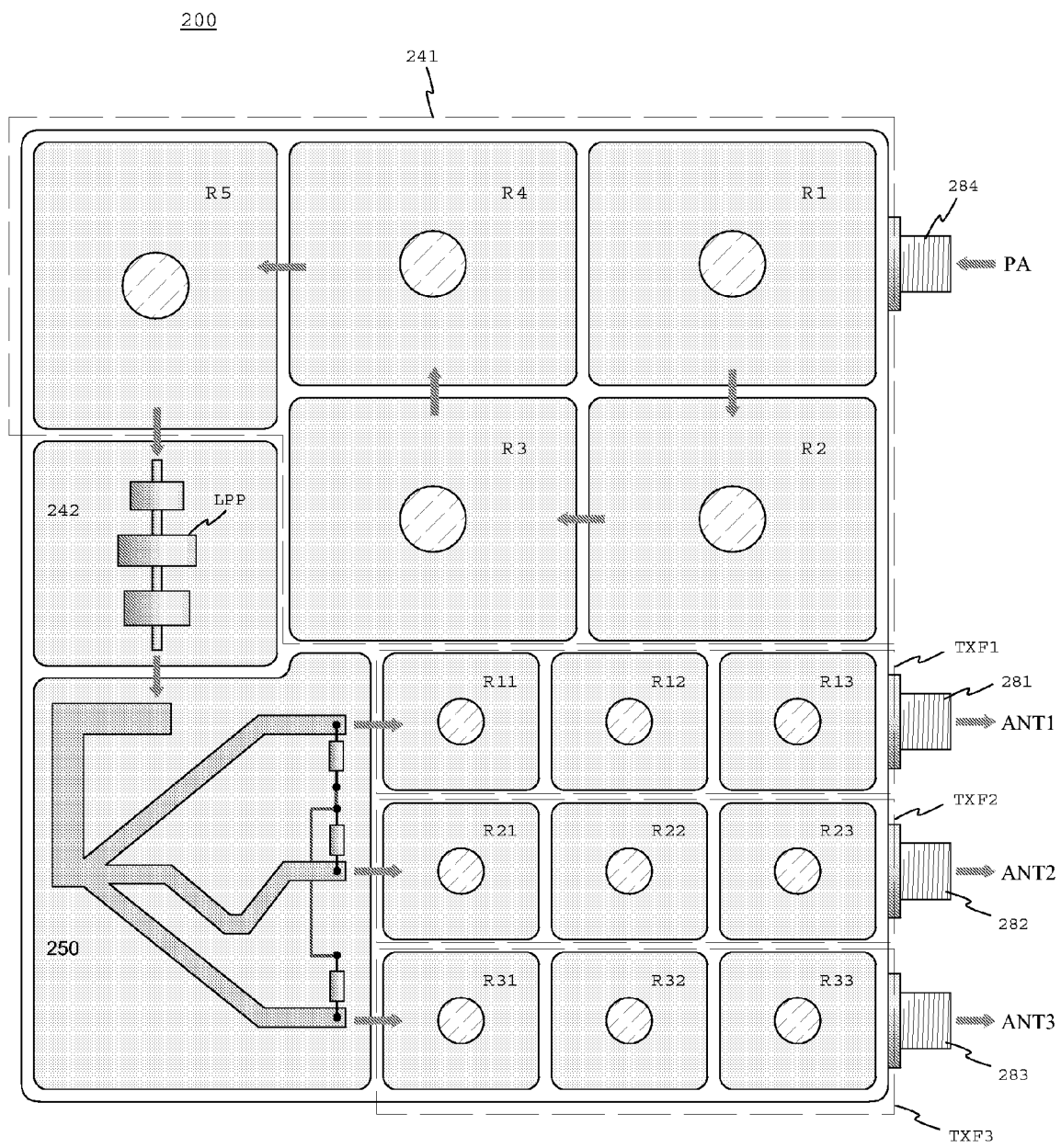
Figure 4:
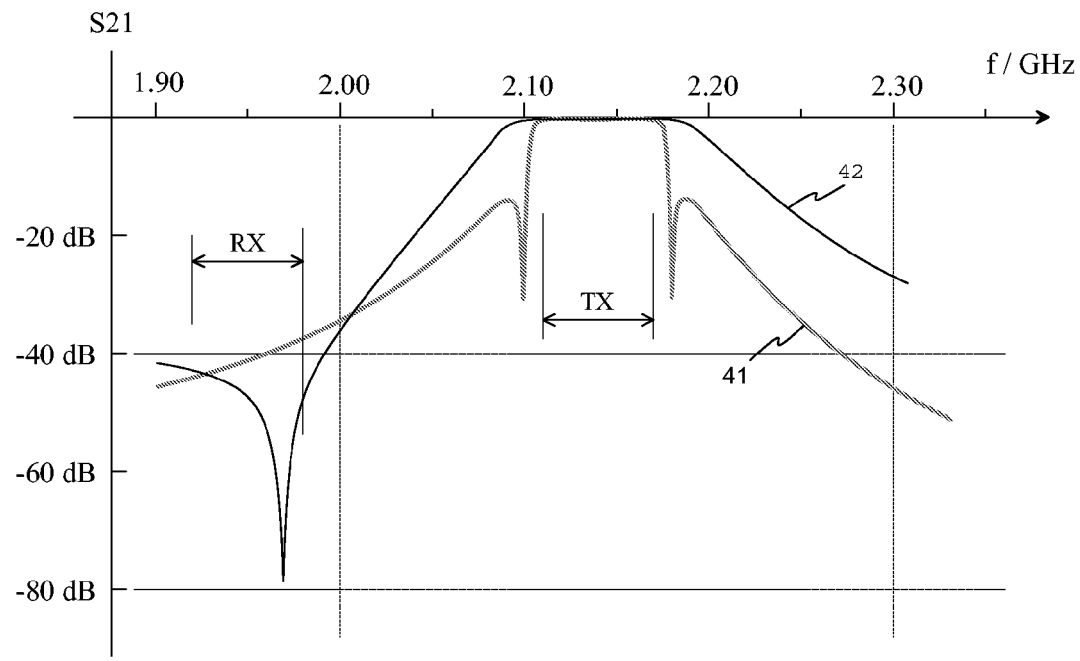
Figure 5:
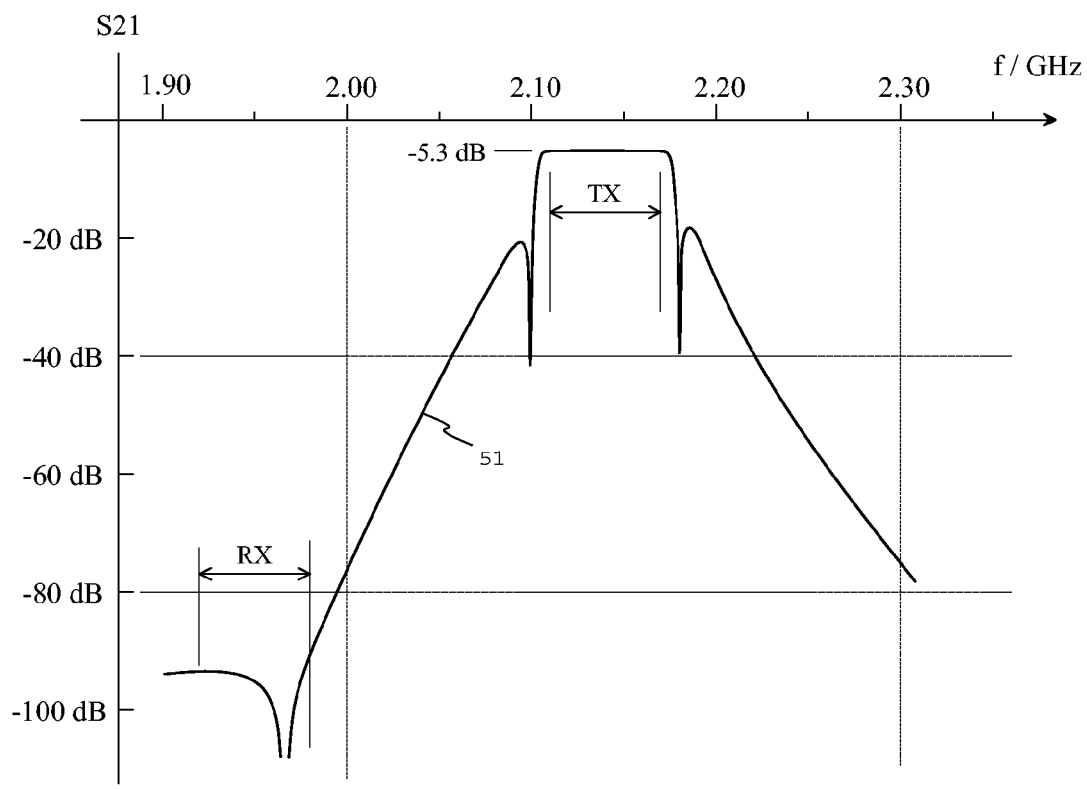

In the following, the invention will be described in more detail. Reference will be made to the accompanying drawings, in which FIG. 1 shows an example of a known filter arrangement at the antenna end of a base station as a block diagram, FIG. 2 shows the filter arrangement according to the invention at the antenna end of a base station as a block diagram, FIG. 3 shows an example of the physical implementation of the filter arrangement according to FIG. 2 in respect of the transmitter, FIG. 4 shows an example of the transmission coefficient of bandpass filters in the arrangement according to the invention, and FIG. 5 shows an example of the total transmission coefficient in the arrangement according to the invention.

FIG. 1 was already explained in connection with the description of the prior art.

Figure 2:
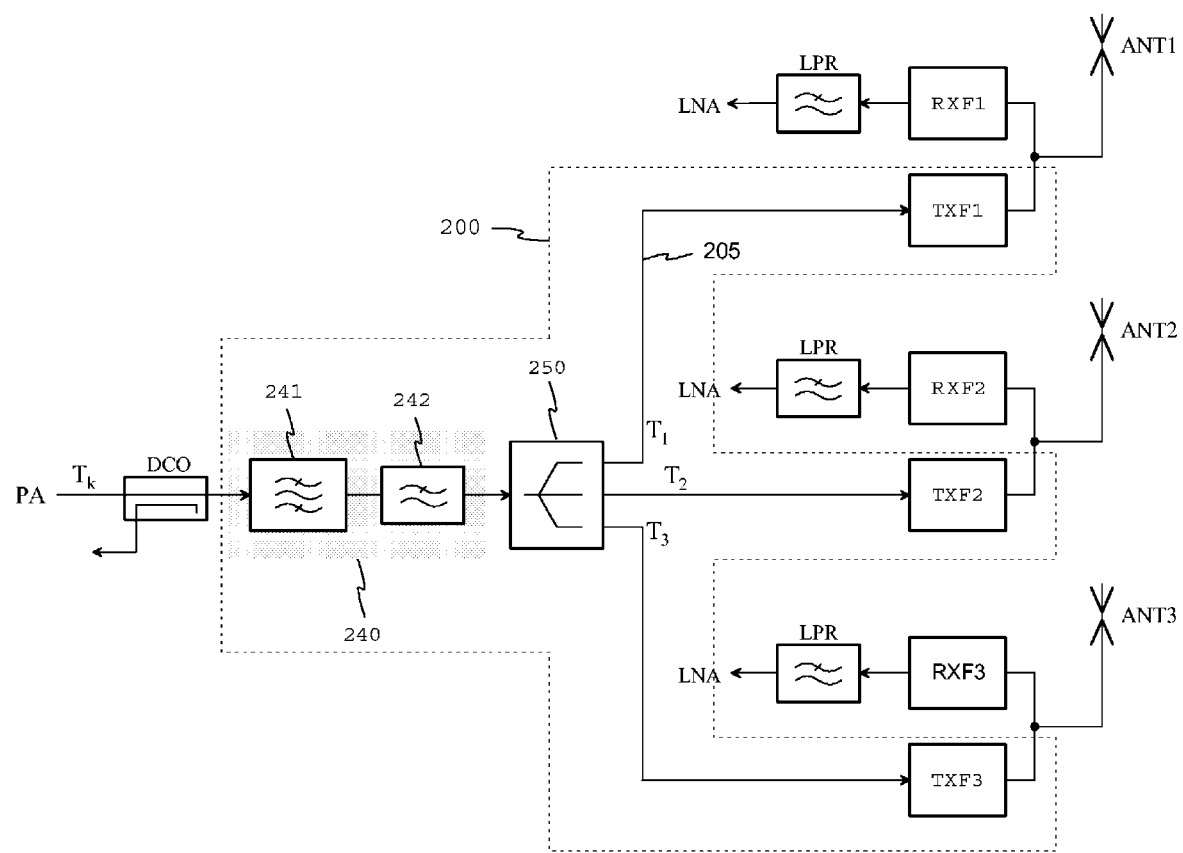

FIG. 2 is a block diagram of the filter arrangement according to the invention at the antenna end of a base station. The filter arrangement is for three sector antennas ANT1, ANT2, ANT3, and each antenna is coupled to its own duplex filter, like in FIG. 1. For the receiver, the arrangement is similar to the one in FIG. 1. So, a transmission path is formed from e.g. the first antenna ANT1 through a bandpass type receiving filter RXF1 and a low-pass filter LPR after it to a low-noise amplifier LNA.

The invention thus relates to the filter arrangement for the part of the transmitter. Compared to FIG. 1, part of the filtering of the signal to be transmitted, or the transmitting signal, has been transferred from the antenna-specific filter units to a shared transmitting filter 240. This includes, as connected in series, a bandpass part 241 and a low-pass part 242. The bandpass part strongly attenuates frequency components outside the transmitting band of the radio system, and the low-pass part cleans the area above the transmitting band of spurious transmissions springing up in the power amplifier, for example. The transmitting signal $T_k$ coming from the power amplifier PA is led through a directional coupler DCO functioning as a measuring element to the shared transmitting filter 240. Its output is connected to the input of a divider 250. The divider outputs three partial transmitting signals of the same level. The first partial transmitting signal $T_1$ is taken to the transmitting side of the first duplex filter, or the first separate transmitting filter TXF1 by an intermediate cable 205. The "afterburning" filter TXF1 adds up the filtering of the partial transmitting signal $T_1$ especially for the frequency components that fall on the receiving band. It is of the bandpass type, and it has naturally the same passband as the bandpass part 241 of the transmitting filter. Correspondingly, the second partial transmitting signal $T_2$ is taken to the second separate transmitting filter TXF2 and the third partial transmitting signal $T_3$ to the third separate transmitting filter TXF3. The shared transmitting filter 240, the divider 250 and the three separate transmitting filters TXF1, TXF2 and TXF3 together form the antenna filter unit 200 of the transmitter.

FIG. 3 shows an example of the physical implementation of the antenna filter unit 200 mentioned above. As a mechanical structure, the filter unit 200 is a metal housing, the outer walls of which are the bottom, side walls and lid. The inner space of the housing has been divided into cavities by conductive partition walls. In FIG. 3, the structure is shown from above with the lid removed. There are 16 cavities in all. Five of these are intended for implementing the bandpass part 241 of the shared transmitting filter. In each of the five cavities there is an inner conductor galvanically connected to the bottom of the housing in a way that together with the surrounding conductor walls it forms a quarter-wave resonator having a certain natural frequency. These five resonators, the resonators R1-R5 in FIG. 3, are electrically connected in series so that they form the bandpass filter 241. The transmitting signal is taken from the power amplifier PA of the transmitter through the connector 284 to the first resonator R1, and from the fifth resonator R5 the partially filtered transmitting signal is taken forward to the low-pass filter 242.

The low-pass filter is implemented in the cavity beside the cavity of the fifth resonator R5. In this example, the low-pass filter is formed of a conductor piece LPP in the cavity and the conductor walls confining the cavity. The low-passing effect is created by the fact that the piece LPP has in turn parts having a significant inductance and other parts having a significant capacitance with the conductor walls confining the cavity.

The divider 250 is implemented in the cavity beside the cavity of the low-pass filter. The divider comprises an input line and three division lines, in each of which one conductor is a relatively rigid strip conductor and the other conductor is formed by the conductor walls confining the cavity. The strip conductors are supported by insulating pieces above the bottom of the housing. The output of the low-pass filter 242 is connected to the input line of the divider, which branches into quarter-wave length division lines. The tail ends of the strip conductors are connected to a common node by resistors having the same resistance as the transmission path impedance in the filters and the input line of the divider.

The rest nine of the sixteen cavities of the filter unit are used to build three separate i.e. antenna-specific transmitting filters. So there are three cavities for each separate transmitting filter, which makes them three-resonator filters when the structure is complemented by inner conductors and couplings between the resonators. The first separate transmitting filter TXF1 is formed of the resonators R11, R12 and R13. The first output of the divider 250 is coupled to the resonator R11, and the first partial transmitting signal is taken out from the resonator R13 through the connector 281. From it, the partial transmitting signal is fed to the first antenna ANT1. Correspondingly, the second separate transmitting filter TXF2 is formed of the resonators R21, R22 and R23. The second output of the divider 250 is coupled to the resonator R21, and the second partial transmitting signal is taken out from the resonator R23 through the connector 282 and fed to the second antenna ANT2. The third separate transmitting filter TXF3 is formed of the resonators R31, R32 and R33. The third output of the divider 250 is coupled to the resonator R31, and the third partial transmitting signal is taken out from the resonator R33 through the connector 283 and fed to the third antenna ANT3.

The propagation directions of the signals are shown by grey arrows in FIG. 3. The implementation of the couplings between the parts of the filter unit is not shown. In each filter, a coupling between adjacent resonators is created by means of a hole made in the partition wall, for example. Each output of the divider is coupled to a separate transmitting filter e.g. by extending the strip conductor of the division line of the divider, or the division conductor, to the cavity of the first resonator of the filter. The bent end of the strip can function as a coupling element or it can be connected to a coupling element being located beside the resonator's inner conductor and joined to the bottom of the housing.

FIG. 4 presents an example of the transmission coefficient $S_{21}$ of the bandpass filters, in other words, their attenuation in the arrangement according to the invention. The base station in question is designed to operate in the WCDMA (Wideband Code Division Multiple Access) system, in which the receiving band RX is 1.92-1.98 GHz and the transmitting band TX is 2.11-2.17 GHz. Curve 41 shows the transmission coefficient of the bandpass part 241 of the shared transmitting filter as a function of the frequency. In the shared filter 241 there are attenuation peaks on both sides of the passband, which are made by couplings over the resonators. Due to them, the attenuation is at least 14 dB already when going 0.01 GHz outside the passband. Curve 42 shows the transmission coefficient of the separate transmitting filter TXFn (n=1, 2, 3) as a function of frequency. In TXF filters, an attenuation peak has been made at 1.97 GHz on the receiving band RX by one overcoupling. The transition bands of the TXF filters beside the passband are naturally wider than those of the shared filter 241 of a higher order. The pass attenuation in the TXF filters is approximately 0.1 dB and in the filter 241 approximately 0.2 dB.

FIG. 5 shows an example of the total transmission coefficient in the arrangement according to the invention from the input of the shared bandpass filter 241 to the output of the separate transmitting filter TXF(n). Between these filters there is the divider 250, which in the case of three outputs causes a lowering of 4.8 dB in the level of the transmitting signal. Curve 51 indicates 5.3 dB of pass attenuation, and so there is only about 0.5 dB of actual losses. This consists of the losses corresponding to the pass attenuation of bandpass filters and the losses of the divider and the low-pass filter. The relatively small amount of losses is due to the high Q values of the resonators of the filters and also to the fact that there are no intermediate cables proper, in which case there are no connectors inside the filter unit with their junctions either. It is also seen from the curve 51 that the total attenuation immediately beside the passband is about 20 dB and over 90 dB on the receiving band RX.

In the structure according to FIG. 3, from which the curves of FIGS. 4 and 5 have been measured, the shared bandpass filter 241 has five resonators, and the cross-sectional area of each resonator cavity is $5.0 \cdot 5.9 \approx 30$ cm$^2$. The three TXF filters have three resonators, and in them the cross-sectional area of each resonator cavity is $2.8 \cdot 3.2 \approx 9.0$ cm$^2$. The total area becomes $5 \cdot 30 + 3 \cdot 3 \cdot 9 \approx 230$ cm$^2$. In order to achieve the result according to FIG. 5 by the known structure shown in FIG. 1, its TXF filters must have seven resonators, and the cross-sectional area of each resonator cavity must be about 18 cm$^2$. The total area then becomes $3 \cdot 7 \cdot 18 = 378$ cm$^2$. With regard to the resonators, space saving of $(378-230)/378 \approx 39\%$ is achieved by the arrangement according to the invention, when the filters are as high in both cases. The advantage is emphasized if the divider is connected to the transmitting filters by coaxial cables in accordance with the present practice. Namely, in that case the transmitting filters must be made such that they have even lower losses, that is, larger in size for compensating the losses caused by cabling. On the other hand, the structure according to the invention is not necessarily quite as integrated as in FIG. 3. On the input and/or output side of the divider there can be a low-loss transmission line of some kind.

In addition to the saving of space, a smaller number of filters and resonators naturally means savings in production costs.

In the filter arrangement for transmitting signals according to the invention, only one low-pass filter is needed instead of the three low-pass filters shown in FIG. 1, which for its part means simplification of the structure and saving of space. If one cavity from the housing of the filter unit is reserved for the low-pass filter according to the example of FIG. 3, the number of cavities required is naturally reduced from three to one.

A filter arrangement according to the invention and an example of its dimensioning have been described above. In the details, such as the number of resonators, there can naturally be variation. The number of antennas for which the filter arrangement is made can also vary. The low-pass filters and the divider belonging to the antenna end can be implemented in different ways; one solution different from the example of FIG. 3 could be using microstrip structures on a circuit board, for example. The inventive idea can be applied in different ways within the scope set by the independent claim 1.

The invention claimed is:

1. A filter arrangement at an antenna end of a radio device using frequency division duplex, the antenna end including a divider with isolated output branches for dividing a radio transmitting signal coming from a power amplifier to antennas which radiate in different sectors, the filter arrangement comprising:
    a separate duplex filter for each of said antennas comprising a separate transmitting filter and a receiving filter, an output of said separate transmitting filter and input of said receiving filter being coupled to a respective one of said antennas, and one of said output branches being coupled to an input of a respective one of the separate transmitting filters; and
    a shared transmitting filter for the antennas, comprising a bandpass part and a low-pass part connected in series, an input of the shared transmitting filter being coupled to a power amplifier and an output of the shared transmitting filter being coupled to an input of said divider so as to simplify said separate transmitting filters and to reduce the space required for the antenna end of the radio device.

2. The arrangement according to claim 1, wherein the bandpass part of the shared transmitting filter and the separate transmitting filters comprises coaxial resonators.

3. The arrangement according to claim 2, wherein the shared transmitting filter, the divider and the separate transmitting filters constitute a filter unit with a unitary conductive housing, an inner space of said unitary conductive housing being divided into cavities by conductive partition walls, each of said coaxial resonators comprising an inner conductor in one of said cavities and surrounding conductive walls of this cavity.

4. The arrangement according to claim 3, wherein the low-pass part of the shared transmitting filter is located in one of said cavities.

5. The arrangement according to claim 3, wherein the divider is located in one of said cavities.

6. The arrangement according to claim 5, wherein the divider is a Wilkinson divider comprising an input line and division lines, a division conductor of each of said division lines being a strip conductor which extends to the cavity of a first resonator of one of said separate transmitting filters to couple the divider to this separate transmitting filter.

7. The arrangement according to claim 2, wherein the divider is connected to said separate transmitting filters by coaxial cables.

8. The arrangement according to claim 2, wherein the number of resonators in each of said separate transmitting filters is at most four.

9. The arrangement according to claim 8, wherein the number of resonators in each of said separate transmitting filters is three, and the number of resonators in the bandpass part of the shared transmitting filter is five.

10. The arrangement according to claim 1, wherein the number of said antennas and said separate transmitting filters is three.

* * * * *